United States Patent [19]

Falcoff et al.

[11] Patent Number: 5,522,638
[45] Date of Patent: Jun. 4, 1996

[54] MULTIFUNCTIONAL GARAGE DOOR OPENER STORAGE COMPARTMENT

[75] Inventors: Monte L. Falcoff, Beverly Hills; James D. Dowd, Farmington Hills; Jeffrey W. Stahlbaum; Robert D. Muller, both of Royal Oak, all of Mich.

[73] Assignee: United Technologies Automotive, Inc., Dearborn, Mich.

[21] Appl. No.: 325,826

[22] Filed: Oct. 19, 1994

Related U.S. Application Data

[63] Continuation of Ser. No. 37,091, Mar. 25, 1993, abandoned.
[51] Int. Cl.⁶ ........................................ B60R 11/00
[52] U.S. Cl. .................. 296/37.8; 296/37.7; 224/282; 224/311; 455/99
[58] Field of Search ................... 296/37.7, 37.8; 224/282, 311, 312; 200/61.62; 340/825.69; 455/99

[56] References Cited

U.S. PATENT DOCUMENTS

| 2,665,577 | 1/1954 | Sanowskis | 292/220 |
|---|---|---|---|
| 2,734,992 | 2/1956 | Elliott et al. | 362/80 |
| 4,241,870 | 12/1980 | Marcus | 296/37.1 |
| 4,247,850 | 1/1981 | Marcus | 340/694 |
| 4,275,913 | 6/1981 | Marcus | 296/37.1 |
| 4,469,365 | 9/1984 | Marcus et al. | 296/37.7 |
| 4,595,228 | 6/1986 | Chu | 296/37.7 |
| 4,867,498 | 9/1989 | Delphia et al. | 296/37.7 |
| 4,941,718 | 7/1990 | Alexander, III et al. | 312/312 |
| 5,020,845 | 6/1991 | Falcoff et al. | 296/37.7 |
| 5,050,922 | 9/1991 | Falcoff | 296/37.7 |
| 5,062,559 | 11/1991 | Falcoff | 296/37.8 X |
| 5,064,974 | 11/1991 | Vigneau et al. | 296/37.7 X |
| 5,077,870 | 1/1992 | Melbye et al. | 24/452 |
| 5,184,132 | 2/1993 | Baird | 340/825.69 |

FOREIGN PATENT DOCUMENTS 4116758  11/1992  Germany .................. 224/311

Primary Examiner—Dennis H. Pedder
Attorney, Agent, or Firm—Harness, Dickey & Pierce

[57] ABSTRACT

An overhead console for a motor vehicle including an integral remote control unit storage compartment is provided. The invention allows for the remote control unit to be activated directly by actuating a pivotable door to an open position or indirectly while the remote control unit remains in the storage compartment.

44 Claims, 3 Drawing Sheets

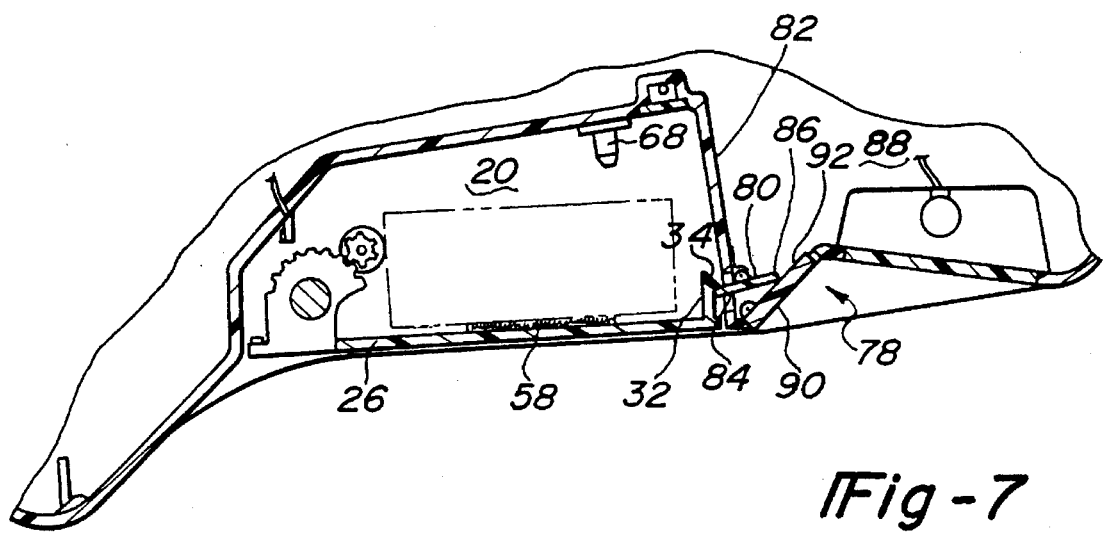

MULTIFUNCTIONAL GARAGE DOOR OPENER STORAGE COMPARTMENT

This is a continuation of U.S. patent application Ser. No. 08/037,091, filed Mar. 25, 1993, now abandoned

BACKGROUND OF THE INVENTION

1. Technical Field

This invention relates generally to overhead consoles for automotive vehicles and, more particularly, to overhead consoles including a compartment for storing a remote control unit for operating a garage door opener.

2. Discussion of Related Art

Overhead console embodiments which include means for retaining a remote control unit for activating a garage door opener are now included in certain automotive vehicles. One such embodiment is an electronic remote control mechanism which is factory ordered and installed into the overhead console as part of the vehicle's electrical system. This type of remote control mechanism is very expensive and is not practical if the owner already has a remote control unit which was purchased along with a garage door actuation device.

Other known overhead console embodiments having means for retaining a remote control unit are mechanically operated storage compartments which retain and actuate single button remote control units. Under one embodiment the remote control unit is mounted to the top of the storage compartment. Upward actuation of the door which accesses the compartment drives a pin into contact with the button thereby activating the remote control unit.

The other known overhead console embodiment retains the remote control unit on an inner panel inside of the door which accesses the storage compartment. Actuation of the switching button is achieved by pushing the end of a lever, which is retained between the compartment door and the inner panel. The lever in turn causes a projection to contact the remote control unit's button to thereby activate the remote control unit thus causing the garage door opener to activate.

Although the aforementioned overhead consoles provide advancements in the art, such mechanically operated storage compartments are incapable of actuating a multifunctional remote control unit having more than one switching button. Furthermore, the mechanically operated storage compartments generally are not designed to host a variety of remote control units having differing button positions.

SUMMARY OF THE INVENTION

In accordance with the teachings of the present invention, an overhead console for use in automotive vehicles is provided having a storage compartment for retaining a remote control unit which operates a garage door opener. The present invention further includes means for activating the remote control unit's garage door actuating button while the compartment door is in a normally closed position.

The storage compartment door which provides access to the remote control unit and the storage compartment itself is pivotally attached to a housing which is formed as an integral part of the overhead console. Provided within the storage compartment is a selectively actuable support member which is pivotally attached to the compartment door. The support member is provided with a button which is accessible through the compartment door. The remote control unit is positioned upon this support member with the remote control unit's garage door actuation button facing upwardly, in the direction of the storage compartment ceiling. Upon pushing the support member button upwardly the remote control unit is driven upwardly such that the garage door actuation button is contacted by a post member which extends downwardly from the ceiling of the storage compartment thereby activating the remote control unit.

For access to the storage compartment, and more particularly, to the remote control unit the compartment door can be manually released to pivot open. Upon opening the compartment door the remote control unit is fully accessible to the operator.

A further aspect of the invention incorporates an illumination device contained within the remote control unit storage compartment. As the compartment door is actuated to an open position a compartment light becomes illuminated to provide a better view of the remote control unit. Upon actuating the compartment door to a normally closed position the compartment light automatically switches off.

BRIEF DESCRIPTION OF THE DRAWINGS

FIG. 7 is a sectional side view of an alternative remote control unit storage compartment.

DETAILED DESCRIPTION OF THE PREFERRED EMBODIMENT

Figure 1:
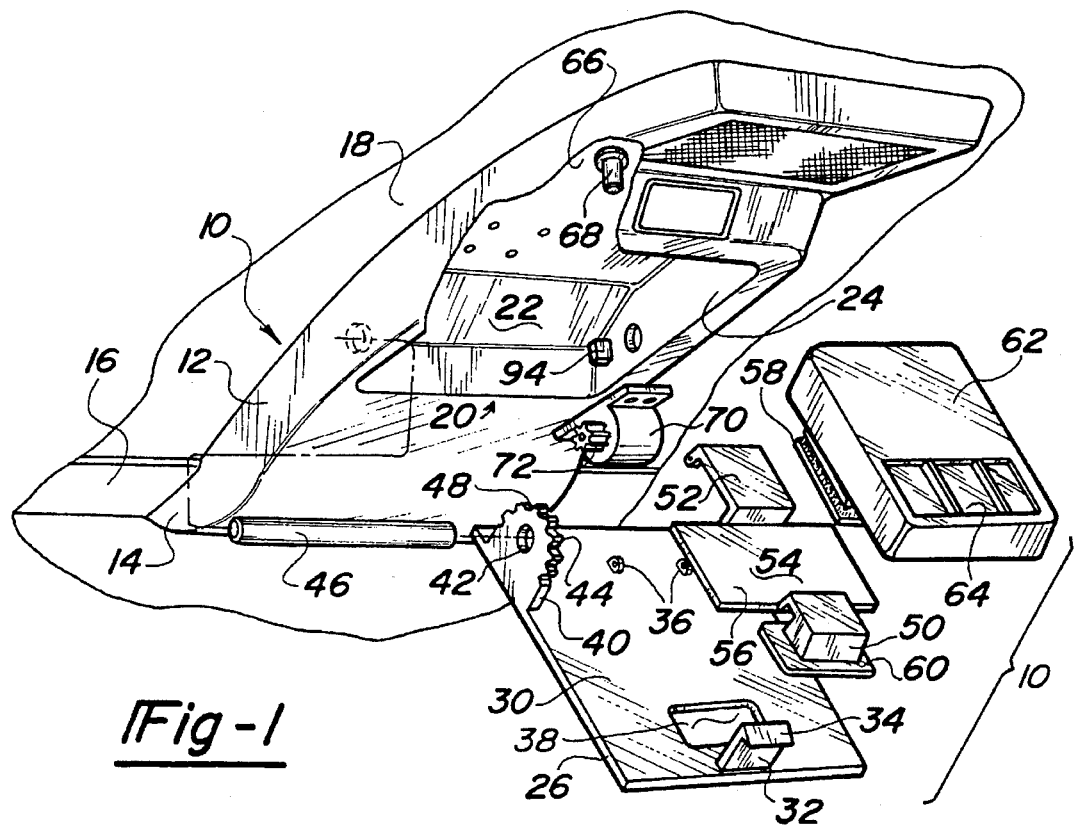
FIG. 1 is an exploded perspective view of the overhead console according to the teachings of the present invention.

Referring to FIG. 1 an exploded perspective view of an overhead console including a multifunctional storage compartment for a garage door actuating remote control unit according to the teachings of the present invention is provided. This overhead console is typically located along the centerline of the vehicle between the sunvisors. The overhead console 10 includes a housing 12 which may contain a variety of features such as reading lamps and lamp outage monitors, among others. Extending from the housing 12 is a bezel 14 which is attached to the vehicle along the headliner 16 to secure the overhead console adjacent the vehicle's roof 18. The housing 12 includes a cavity 22 formed by downwardly extending sidewalls 24 and a selectively actuable compartment door 26 which defines the area referred to herein as the remote control unit storage compartment 20.

The compartment door 26 includes a flange 32 extending upwardly from the inner surface 30 thereof. The flange 32 is provided with an extending tab 34 for securing the compartment door in closed position. The inner surface 30 of the compartment door 26 also includes a pair of spaced apart retainers 36 disposed proximate to the front end of the compartment door for receiving a pivot member (not shown). Also, extending upwardly from the inner surface 30 of the compartment door 26 is a cam member 40. The cam member 40 includes an aperture 42 for receiving a pivot pin 46 and gear teeth 44 positioned along the arcuate upper edge 48 which assist in controlling the rate at which the compartment door is actuated. Disposed along the trailing end of the compartment door 26 is an aperture 38.

Pivotally attached to the inner surface 30 of the compartment door 26 via the retainers 36 is a support member 50 upon which a remote control unit 62 is mounted. This support member 50 includes relatively flat surface 52 against which the remote control unit 62 rests and a depression 54 including a plate 56 upon which means for securing the remote control unit to the support member is disposed. Preferably the means 58 for securing the remote control unit 62 to the support member 50 is a Dual Lock® fastener having a pressure sensitive adhesive backing which is available from the Minnesota Manufacturing and Mining Co. (3M). An alternate means for securing the remote control unit is a Velcro® hook and loop type fastener backed with pressure sensitive adhesive as shown more clearly in FIGS. 2, 3 and 4. The support member 50 further includes a selectively actuable button 60 which normally extends into the aperture 38 contained on the compartment door 26.

Figure 2:
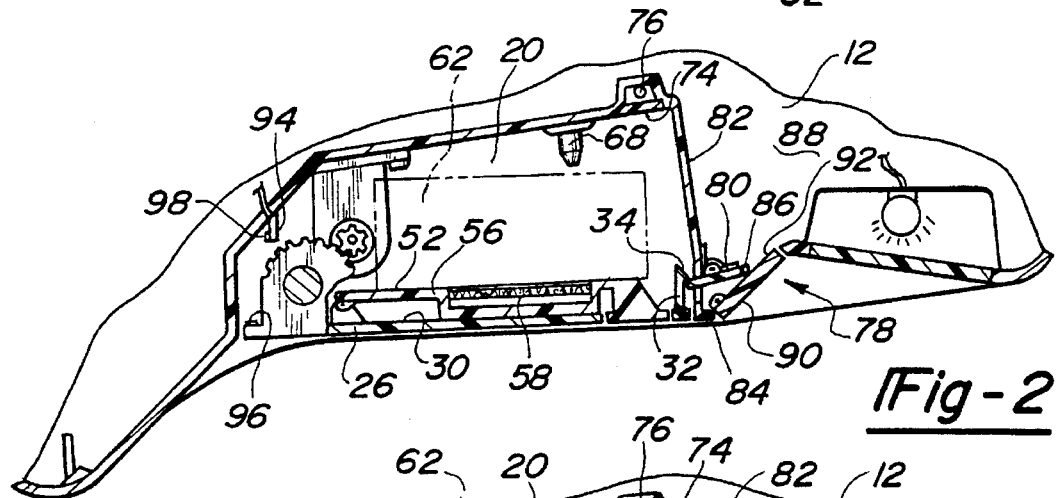
FIG. 2 is a sectional side view of the remote control unit storage compartment shown in a normally closed position.

Extending from the ceiling 66 of the storage compartment 24 is a post member 68 against which the remote control unit's signal transmitting button 64 is engagable. As shown in FIG. 2 sufficient clearance is provided between the remote control unit 62 and post member 68 to prevent inadvertent activation of the remote control unit. Also attached to and extending from the ceiling 66, or optionally a sidewall 24, is a coupling 70 having gear teeth 72 which mate with the gear teeth 44 contained on the cam 40. Preferably the coupling 70 is a constant force viscous dampener which controls the pivotal motion of the compartment door 26.

Figure 3:
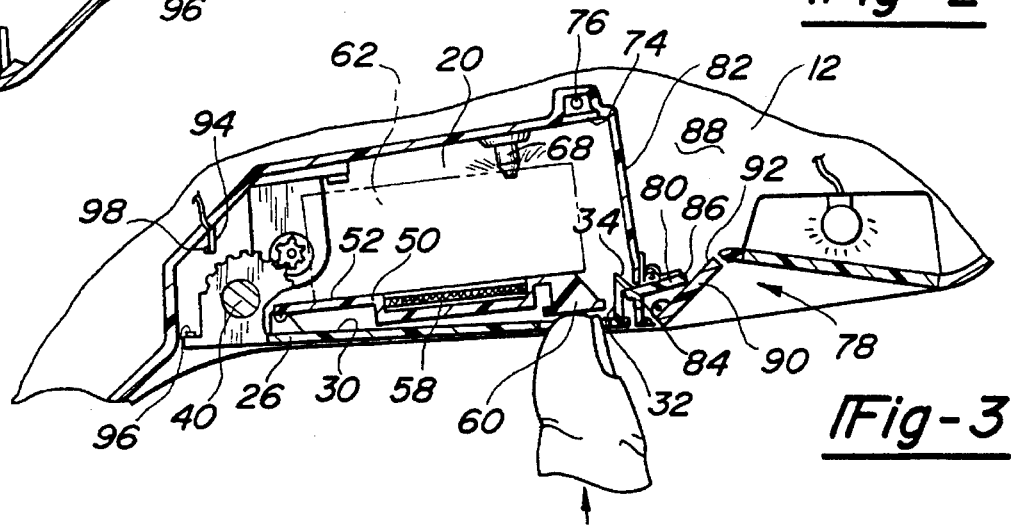
FIG. 3 is a sectional side view of the remote control unit storage compartment shown with the support member being rotated upwardly.
Figure 4:
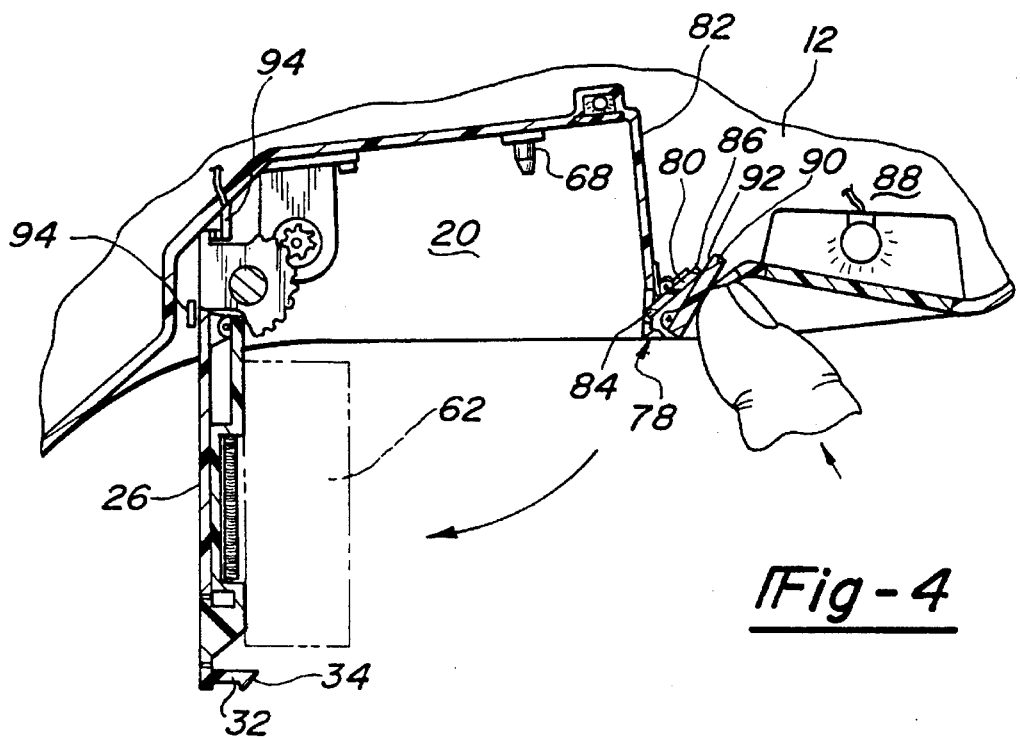
FIG. 4 is a sectional side view of the remote control unit with the storage compartment door shown in an open position.

The overhead console 10 also includes latching means 78, as shown in FIGS. 2, 3 and 4, for selectively maintaining the compartment door 26 in a closed position. The latching means 78 are selectively actuable to release the compartment door 26 thus allowing access to the remote control unit storage compartment 24. The latching means include a spring loaded stop 80 which is pivotally attached to the housing 12 along the rear wall 82 of the storage compartment 20. A first end 84 of the stop 80 extends into the storage compartment 20 to engage the tab 34 contained on flange 32 and the second end 86 of the stop 80 extends into an open area 88 within the housing 12. The latching means further include a button 90 which is disposed on the housing 12 for rotating the spring loaded stop.

The operational aspects of the present invention will now be described in greater detail. Referring to FIG. 2 the remote control unit storage compartment 20 is shown with the compartment door 26 in a normally closed position. In the normally closed position the tab 34 extending from the flange 32 is engaged by the first end 84 of the stop 80 to retain the compartment door 26 in a closed position. When the compartment door 26 is in this closed position the support member 50 comes to rest upon the inner surface 30 of the compartment door 26 such that the button 60 contained on the support member 50 extends into the aperture 38 provided on the compartment door 26. The remote control unit 62 is positioned upon the support member 50 such that the signal transmitting button 64 is in proper alignment with the post member 68.

To activate the remote control unit without opening the compartment door 26 the operator may push the support member button 60 upwardly into the storage compartment 20 thus driving the remote control unit 62 into the post member 68. As demonstrated in FIG. 3 when the post member 68 sufficiently contacts the remote control unit's signal transmitting button 64 the remote control unit sends a controlling signal.

To gain entry to the remote control unit storage compartment 20, the latching means 78 must be manipulated. To manipulate the latching means 78, the operator pushes the door release button 90 disposed on the housing 12 inwardly. When the door release button 90 is pushed inwardly the inner surface 92 of the button 90 engages the end 86 of the stop 80 which in turn rotates that end upwardly. This causes the other end 82 to rotate downwardly. Once the stop 80 has been manipulated to a sufficient vertical position clearance is provided between the first end 84 and the tab 34 thus allowing the compartment door to swing downwardly about the pivot 46. This allows the operator to activate any other buttons contained on the remote control unit.

Rotation of the compartment door 26 is limited by a rib 94 which extends from a sidewall 24, the ceiling 66, or both the sidewall 24 and ceiling 66 of the storage compartment 20 as shown in FIG. 4. Upon rotating the compartment door 26, the inner surface 30 of the compartment door 26 engages the rib 94.

Optionally, as shown more clearly in FIGS. 2, 3 and 4 a lens 74 and bulb 76 arrangement may be provided within the storage compartment 20 to illuminate the remote control unit 62. When the compartment door 26 is actuated to an open position a switch contact 96 on the inner surface 30 of the compartment door 26 is contacted by a switch 98 contained on the rib 94 thereby completing the electrical circuit causing the bulb to become illuminated. By actuating the compartment door 26 to a normally closed position the switches become disconnected and the bulb would remain off.

According to a preferred embodiment of the present invention it is highly desirable to control the rate at which the compartment door swings open. This is especially true when heavier remote control unit models are used since the weight of the remote control unit 62 would cause the compartment door 26 to open rather quickly.

Figure 5:
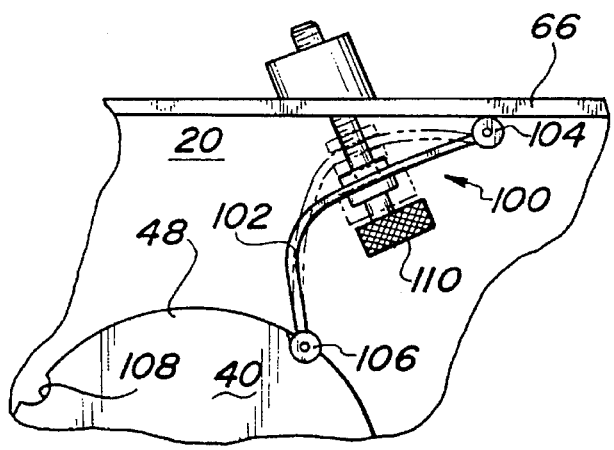
FIG. 5 is a sectional side view showing an alternative compartment door pivoting mechanism embodiment according to the teachings of the present invention.

In place of the viscous dampener coupling previously described, other embodiments may be used for limiting the rate at which the compartment door is capable of swinging open. The rate at which the compartment door 26 is opened can be controlled by the mechanism 100 shown in FIG. 5. The mechanism 100 includes a leaf spring 102 having one end 104 pivotally attached to the ceiling 66 of the storage compartment 20 and the other end 106 frictionally riding along the arcuate edge 48 of the modified cam 40. The edge of the cam is relatively smooth and is provided with one or more detents 108 which receives the end 106 of leaf spring 102 to limit the degree of actuation of the compartment door. In the event that the remote control unit is relatively heavy it may be desirable to vary the frictional force applied to the cam 40. The tension on the leaf spring 102 is adjustable by loosening or tightening the clamping mechanism 110. Preferably, the leaf spring 102 is made from a resilient spring steel.

Figure 6:
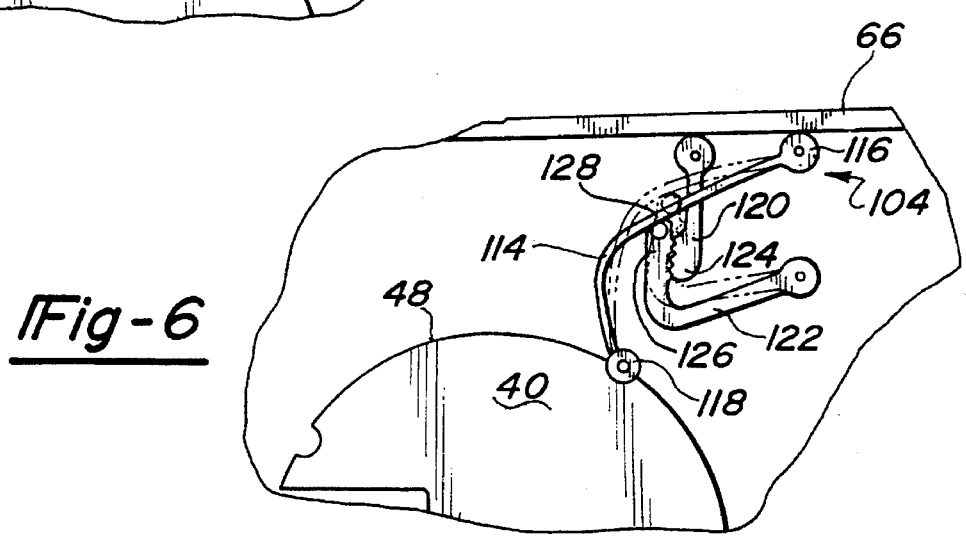
FIG. 6 is a sectional view showing another compartment door pivoting mechanism embodiment according to the teachings of the present invention.

Alternatively, as shown in FIG. 6, another mechanism 112 can be used for controlling the rate at which the compartment door is opened. The leaf spring 114 includes a first end 116 which is pivotally attached to the ceiling 66 of the storage compartment 20 and a second end 118 which is forcibly compressed against the arcuate edge 48 of the cam 40. The compressive force of the leaf spring 114 can be adjusted through a pair of mating ratchet arms 120 and 122, respectively. The first ratchet arm 120 is spring loaded to push the end 124 of the ratchet in a forward direction. Similarly, the other pivotally fixed ratchet arm 122 has an end 126 which is forced downwardly and generally rearwardly by engagement with the leaf spring 114 at projection 128. Thus, the compressive force of the leaf spring is adjusted by manually separating the ratchet arms 120 and 122 and readjusting them to the position which supplies the desired amount of tension. Preferably, the leaf spring 114 is made from a resilient spring steel and the ratchet arms 120 and 122 are preferably made from engineering grade polymeric material.

Typically the housing and support member are injection molded from heat resistant ABS or an engineering grade polymer such as Lexan Polycarbonate made by the General Electric Company. Due to durability requirements the compartment door may need to be manufactured from an engineering grade polymer such as a glass and/or fiber reinforced Nylon or Acetel.

Under an alternative embodiment as shown in FIG. 7 the remote control unit storage compartment 20 differs in that the pivotal support member has been eliminated. Since all other features of this embodiment are the same, identical reference numerals will be used for like features. According to this embodiment the remote control unit 62 is attached directly to the inner surface 30 of the pivotal compartment door 26. Again, the preferred method of attaching the remote control unit 62 is through the use of a Dual Lock® fastener 58 with a pressure sensitive adhesive backing, although other commercially available forms such as a Velcro® hook and loop fastener can be used.

To activate the remote control unit 62 contained within the remote control unit storage compartment 20 as shown in FIG. 7 the compartment door 26 can be actuated upwardly within the storage compartment 20 such that one of the buttons 64 contained on the remote control unit 62 contacts the extending post member 66 as previously described with reference to the embodiments of FIGS. 1, 2 and 3. The operator merely pushes the compartment door 26 upwardly within the storage compartment 20 thereby driving the remote control unit 62 into contact with the post member 68. When the operator lets the compartment door 26 drop, the tab 34 on flange 32 engages the spring loaded step 80 to hold the compartment door 26 in a normally closed position. The spring is sufficiently tight to receive the weight of the compartment door and remote control unit under the downward force which results from releasing the door.

The remote control unit 62 can also be activated manually by releasing the compartment door 26 using door release button 90 as previously described with reference to FIGS. 2, 3 and 4. The compartment door actuates downwardly sufficiently to allow the operator to activate the unit by touching button 64. The rate of actuation is controlled by one of the aforementioned embodiments. After activating the remote control unit 62 the operator can actuate the door 26 upwardly until the tab 34 snaps past the stop 80 thus returning the compartment door 26 to the normally closed position.

While it will be apparent that the preferred embodiments of the invention disclosed are well calculated to fulfill the objects stated, it will be appreciated that the invention is susceptible to modification, variation and change without departing from the spirit thereof.

What is claimed is:

1. An overhead console for a motor vehicle, comprising:
   a housing including a remote control unit storage compartment having a ceiling and downwardly extending walls which define a cavity, wherein the ceiling includes at least one downwardly extending post member;
   a pivotable support member including means for retaining a remote control unit having at least one signal transmitting button;
   a pivotable door assembly including:
   (a) means for pivotally retaining said support member;
   (b) a flange extending upwardly from the inner surface of said pivotable door including a projecting tab; and
   (c) an aperture which provides access to said support member while said pivotable door is in a closed position; and
   latching means for engaging the tab to selectively retain said door assembly in a closed position;
   whereby upon sufficient upward rotation of said support member the signal transmitting button of said remote control unit contacts said at least one extending post member to activate the remote control unit while the remote control unit is concealed within the overhead console.

2. The overhead console of claim 1, further comprising means for controlling the actuation rate of the pivotable door.

3. The overhead console of claim 2, wherein said means for controlling the actuation rate of the pivotable door includes a cam with an arcuate edge having gear teeth disposed thereon which extend from said door,, and a coupling extending from said ceiling, said coupling including an extending rotatable gear including teeth which mate with the gear teeth of said cam.

4. The overhead console of claim 3, wherein said coupling is a viscous dampener coupling.

5. The overhead console of claim 2, wherein said means for controlling the actuation rate of the pivotable door includes a cam extending from said door which includes an arcuate edge having at least one detent and a leaf spring having tension control means, said leaf spring being pivotally attached at a first end to the ceiling and frictionally positioned along the arcuate edge of said cam at a second end.

6. The overhead console of claim 5, wherein said tension control means includes an adjustable clamping mechanism attached to said leaf spring.

7. The overhead console of claim 5, wherein said tension control means includes first and second adjustable ratchet arms, said first ratchet arm contacts said leaf spring under pressure thereby controlling the tension on said leaf spring and said second ratchet arm mates with said first ratchet arm to secure the first ratchet arm in a predetermined position.

8. The overhead console of claim 1, wherein said means for retaining said remote control unit includes providing said support member with a first surface and a recessed second surface, wherein said recessed second surface includes means for attaching said remote control unit.

9. The overhead console of claim 8, wherein said means for attaching said remote control unit includes a mushroom-shaped hook and loop fastener with a pressure sensitive adhesive backing.

10. The overhead console of claim 8, wherein said means for adhering said remote control unit includes a hook and loop fastener, wherein a first portion of said hook and loop fastener is disposed on said recessed second surface to mate with a second portion of said hook and loop fastener which is disposed on the bottom surface of said remote control unit.

11. The overhead console of claim 1, further comprising illumination means, disposed within said cavity, whereby upon opening said pivotable door assembly said illumination means becomes illuminated.

12. The overhead console of claim 11, wherein said illumination means comprises a switching means operably interactive with said pivotable door, a bulb, and an electrical circuit completed by contacting a portion of said door against said switching means.

13. The overhead console of claim 1, wherein said latching means for engaging the tab to selectively retain the pivotable door assembly in a closed position includes a spring loaded stop pivotally attached to the housing and an actuable button for rotating the spring loaded stop, the stop includes a first end which extends into the cavity to engage said tab and a second end which is engagable by said button, whereby upon driving the button upwardly against the second end of the stop the first end of the stop disengages the tab thereby releasing the pivotable door thus allowing direct access to the remote control unit.

14. An overhead console for a motor vehicle, having an integral remote control unit storage compartment, comprising:
   a housing including a ceiling and downwardly extending walls which form a cavity defining the remote control unit storage compartment, said ceiling including at least one downwardly extending post member;
   a pivotable support member having a first surface for hosting a remote control unit having at least one actuation button disposed on a top surface thereof, a support member button extending from said first surface; and
   a pivotable door including an outer appearance surface, an inner surface for supporting said pivotable support member, a latch for selectively retaining said door in a closed position;
   whereby upon pushing the support member button upwardly within the storage compartment said at least one actuation button of said remote control unit is contacted by the downwardly extending post member to activate said remote control unit.

15. The overhead console of claim 14, further comprising means for controlling the actuation rate of the pivotable door.

16. The overhead console of claim 15, wherein said means for controlling the actuation rate of the pivotable door includes a cam with an arcuate edge having gear teeth disposed thereon which extend from said door, and a coupling extending from said ceiling, said coupling including an extending rotatable gear including teeth which mate with the gear teeth of said cam.

17. The overhead console of claim 16, wherein said coupling is a viscous dampener coupling.

18. The overhead console of claim 15, wherein said means for controlling the actuation rate of the pivotable door includes a cam extending from said door which includes an arcuate edge having at least one detent and a leaf spring having tension control means, said leaf spring being pivotally attached at a first end to the ceiling and frictionally positioned along the arcuate edge of said cam at a second end.

19. The overhead console of claim 15, wherein said tension control means includes an adjustable clamping mechanism attached to said leaf spring.

20. The overhead console of claim 18, wherein said tension control means includes first and second adjustable ratchet arms, said first ratchet arm contacts said leaf spring under pressure thereby controlling the tension on said leaf spring and said second ratchet arm mates with said first ratchet arm to secure the first ratchet arm in a predetermined position.

21. The overhead console of claim 14, wherein said remote control unit is retained to said support member, a recessed second surface of said support member is fastened to said remote control unit.

22. The overhead console of claim 21, wherein said means for adhering said remote control unit includes a mushroom-shaped hook and loop fastener with a pressure sensitive adhesive backing.

23. The overhead console of claim 21, wherein said means for adhering said remote control unit includes a hook and loop fastener, wherein a first portion of said hook and loop fastener is disposed on said recessed second surface to mate with a second portion of said hook and loop fastener which is disposed on a bottom surface of said remote control unit.

24. The overhead console of claim 14, further comprising illumination means, disposed within said cavity, whereby upon opening said pivotable door assembly said illumination means becomes illuminated.

25. The overhead console of claim 24, wherein said illumination means comprises a switching means operably interactive with said pivotable door, a bulb, and an electrical circuit completed by contacting a portion of said door against said switching means.

26. The overhead console of claim 14, wherein said latch includes a spring loaded stop pivotally attached to the housing and an actuable button for rotating the spring loaded stop, the stop includes a first end which extends into the cavity to engage said tab and a second end which is engageable by said button, whereby upon driving the button upwardly against the second end of the stop the first end of the stop disengages the tab thereby releasing the pivotable door thus allowing direct access to the remote control unit.

27. An overhead console for a motor vehicle, having a remote control unit storage compartment, comprising:
   a housing mounted substantially adjacent to a roof of said motor vehicle, a remote control unit being stowable within said housing;
   a pivotable member having an inner surface against which a portion of said remote control unit is retained, said remote control unit having at least one actuation button disposed thereon, said at least one actuation button being actuable when said pivotable member is in a first position defined between a substantially horizontal attitude inclusive and said roof of said motor vehicle; and
   a selectively engagable and disengagable latch, said latch normally retaining said pivotable member in a position where said remote control unit is substantially concealed;
   whereby upon disengaging said latch, said pivotable member rotates downwardly to a second substantially vertical position allowing direct finger access and actuation of said at least one actuation button on said remote control unit.

28. The overhead console of claim 27, further comprising a post member extending from a ceiling, whereby upon pushing said pivotable member upwardly within said storage compartment said at least one actuation button of said remote control unit is contacted by a downwardly extending post member to activate said remote control unit.

29. The overhead console of claim 27, further comprising means for controlling the actuation rate of said pivotable member.

30. The overhead console of claim 29, wherein said means for controlling the actuation rate of said pivotable member includes a cam with an arcuate edge having gear teeth disposed thereon which extend from said pivotable member, and a coupling extending from said ceiling, said coupling including an extending rotatable gear including teeth which mate with the gear teeth of said cam.

31. The overhead console of claim 29, wherein said coupling is a viscous dampener coupling.

32. The overhead console of claim 29, wherein said means for controlling the actuation rate of said pivotable member includes a cam extending from said pivotable member which includes an arcuate edge having at least one detent and a leaf spring having tension control means, said leaf spring being pivotally attached at a first end to the ceiling and frictionally positioned along the arcuate edge of said cam at a second end.

33. The overhead console of claim 32, wherein said tension control means includes an adjustable clamping mechanism attached to said leaf spring.

34. The overhead console of claim 32, wherein said tension control means includes first and second adjustable ratchet arms, said first ratchet arm contacts said leaf spring under pressure thereby controlling the tension on said leaf spring and said second ratchet arm mates with said first ratchet arm to secure the first ratchet arm in a predetermined position.

35. The overhead console of claim 27, wherein said remote control unit is attached to said pivotable member by a mushroom-shaped hook and loop fastener with pressure sensitive adhesive backing.

36. The overhead console of claim 27, wherein said remote control unit is attached to said pivotable member by a hook and loop fastener, wherein a first portion of said hook and loop fastener is disposed on an inner surface of said pivotable member and a second portion of said hook and loop fastener is disposed on a bottom surface of said remote control unit.

37. The overhead console of claim 27, further comprising an illumination source disposed within said cavity, whereby upon opening said pivotable member said illumination source becomes illuminated.

38. The overhead console of claim 37, wherein said illumination source is electrically coupled with a switch operably interactive with said pivotable member.

39. The overhead console of claim 27, wherein said latch includes a spring loaded stop pivotally attached to the housing and an actuable latch button for rotating said spring loaded stop, said spring loaded stop includes a first end which extends to engage a tab coupled with said pivotable member and a second end which is engageable by said latch button, whereby upon driving said latch button upwardly against said second end of said spring loaded stop said first end of said spring loaded stop disengages said tab thereby releasing said pivotable member so as to allow direct access to said remote control unit.

40. An overhead console for a motor vehicle, having a remote control unit storage compartment, a remote control unit defined by a viewable front face, a substantially hidden back face, and at least four sides extending therebetween, comprising:

a pivotable member having a surface against which said back face of said remote control unit is at least partially secured, said remote control unit having an actuation button disposed thereon; and said pivotable member rotatable from a substantially closed position wherein said remote control unit is substantially concealed and the pivotable member is located below the back face to a substantially open vertical position where said actuation button is directly accessible for finger actuation, said front face and said at least four sides of said remote control unit being clearly accessible and viewable when said pivotable member is moved to said substantially open vertical position thereof.

41. An overhead console for a motor vehicle, comprising:

a housing including a remote control unit storage compartment having at least a partial ceiling with at least one downwardly extending post member;

a pivotable support member retaining a remote control unit having at least one signal transmitting button;

a pivotable door assembly coupled to said support member, said door assembly stowable in a substantially closed position;

whereby upon sufficient upward rotation of said support member said signal transmitting button of said remote control unit contacts said at least one extending post member to activate the remote control unit while the remote control unit is substantially concealed within the overhead console.

42. The overhead console of claim 40, further comprising a post member downwardly extending from a ceiling, whereby upon pushing said pivotable member upwardly within said storage compartment said actuation button of said remote control unit is contacted by said post member to activate said remote control unit.

43. The overhead console of claim 40, further comprising means for controlling an actuation rate of said pivotable member.

44. The overhead console of claim 41, further comprising means for controlling an opening actuation rate of said pivotable door.

* * * * *